Patented Apr. 24, 1951

2,550,020

UNITED STATES PATENT OFFICE 2,550,020

MANUFACTURE OF PRIMARY AMINES

Horace Finningley Oxley and Edward Boaden Thomas, Spondon, near Derby, England, and Frank Sandham Nichols, Pittsfield, Mass., assignors to Celanese Corporation of America, a corporation of Delaware No Drawing. Application April 23, 1947, Serial No. 743,468. In Great Britain May 6, 1946

7 Claims. (Cl. 260—585)

This invention relates to the manufacture of primary amines.

One method by which a great many primary amines can be made is by the reaction of ammonia with a compound containing a reactive halogen atom attached to carbon. (The term "reactive halogen atom" denotes here a halogen atom which is fairly easily replaced by another atom or group. In general halogen atoms attached to carbon atoms forming part of an aliphatic group or compound are "reactive" in this sense, for instance the chlorine atoms in the alkyl chlorides such as methyl or butyl chlorides, and in aralkyl chlorides, such as benzyl chloride; nuclear halogen atoms in aromatic hydrocarbons are not as a rule reactive, but other substitutent groups in the nucleus may render them so; thus the chlorine in chlorobenzene is not reactive, but that in o- or p-chlor-nitro-benzene is reactive.)

This method of making primary amines has the disadvantage that there is a strong tendency for secondary and tertiary amines to be formed at the same time. This tendency can be overcome to some extent by employing a very large excess of ammonia over that theoretically required to react with the halogen compound, and/or by carrying out the reaction in an alcoholic medium instead of the more convenient aqueous medium. Both these expedients have obvious disadvantages when adopted on an industrial scale.

The present invention provides a process which, while needing neither a very large excess of ammonia nor an alcoholic reaction medium, gives rise to little or no secondary or tertiary amine. On the other hand the yield of primary amine is better than is obtained by the older processes.

In accordance with the invention primary amines free or nearly free from secondary and tertiary amines are made by heating an organic compound containing a reactive halogen atom attached to a carbon atom, and free from atoms and radicles other than halogen which would react with ammonia under the conditions employed, with ammonia in an aqueous medium containing a large molecular excess of an ammonium halide under a pressure sufficient to maintain the reactants and the reaction medium substantially in the liquid phase. Preferably a chlorinated organic compound is heated with ammonia in the presence of ammonium chloride. The amines produced may be isolated in the form of their hydrochlorides or other hydrohalides.

Although the invention makes it possible to dispense with the use of a very large excess of ammonia, it is advisable to employ a moderate excess, for example 1.5–3 molecular proportions for each molecular proportion of a mono-halogenated compound. A considerably larger excess of the ammonium halide should be used, preferably 8 or more, e. g. 10, 12 or 15 molecular proportions. When a di- or poly-amine is to be made from a di- or poly-halogenated compound the figures given above should be multiplied by the number of reactive halogen atoms in the compound.

The reaction medium is preferably water, although aqueous mixtures, e. g. aqueous alcohol, may be employed if desired. It is however, as already pointed out, an advantage of the present invention that it makes it possible to obtain the primary amines without using a reaction medium comprising alcohol.

The reaction requires the use of fairly high temperatures, preferably above 100° C., e. g. between about 120° and 200° C., and especially between about 130° and 180° C.; the best temperature to use in any particular instance will depend on the particular amine which is being made. The concentration of ammonia in the reaction medium may vary over a wide range, e. g. from 10 to 30%, so long as the amount of the medium is at least sufficient to dissolve the ammonium halide. It is advisable to keep the reactants in continuous motion, for example by means of a rapidly rotating stirrer, so as to ensure adequate mixing at all times during the reaction.

The process of the invention is of particular value in the production of primary alkyl amines and alkylene diamines, and is illustrated by the following example, which describes the production of n-butylamine from butyl chloride and ammonia.

Example

A charge consisting of about 3.1 molecular proportions of butyl chloride, 6.7 molecular proportions of ammonia in the form of a 20% aqueous solution, and 33 molecular proportions of ammonium chloride, is introduced into a stainless steel autoclave provided with a propeller stirrer. The charge is heated to 150°–170° C. for six hours, and is then cooled to about 80–90° C. At this temperature it is transferred to a still wherein it is distilled to dryness, the final stages of the distillation being carried out under reduced pressure and at a base temperature up to 120° C. The distillate comprises all the unreacted ammonia in aqueous solution and is available for re-use. The residue comprises ammonium chloride and butylamine hydrochloride, and is extracted three times with a boiling mixture of 3 parts of acetone to 1 part of methanol. The residue is pure ammonium chloride and is available for re-use. The extracts are united and the solvent distilled off, leaving substantially pure butylamine hydrochloride.

Substantially no dibutylamine or tributylamine hydrochloride is formed. The chief by-product is a small amount of butanol which can be recovered from the final aqueous distillate.

If it is desired to obtain the free base the butylamine hydrochloride is treated with a slight excess of sodium hydroxide in 40% aqueous solution. The mixture is distilled up to a base temperature of 120° C. under atmospheric pressure, giving a distillate consisting of a mixture of about 88% of butylamine and 12% of water. A further small amount of butylamine can be obtained in dilute aqueous solution by continuing the distillation under reduced pressure. Anhydrous butylamine can if desired be obtained by distilling the aqueous butylamine from solid sodium or potassium hydroxide. The yield of butylamine on the butyl chloride is about 81%.

It is not necessary to use absolutely pure butyl chloride. Thus when the butyl chloride is made from butanol and hydrochloric acid it may contain a certain amount of unchanged butanol. This however does not interfere with the main reaction, and can be recovered with any butanol formed during the reaction as already described.

In place of the butyl chloride butyl bromide may be used: it is then preferable to substitute ammonium bromide for the ammonium chloride.

Similar conditions are employed for converting other alkyl chlorides, e. g. methyl chloride, ethyl chloride, n- and iso-propyl chlorides, iso- and tertiary butyl chlorides into the corresponding primary amines. Diamines and polyamines, e. g. ethylene diamine from ethylene chloride and hexamethylene diamine from 1:6-dichlorhexane, can be made in a similar manner, multiplying the proportions of ammonia and ammonium chloride by the number of chlorine atoms to be replaced.

Having described our invention, what we desire to secure by Letters Patent is:

1. Process for the manufacture of aliphatic primary amines, which comprises heating in an aqueous reaction medium to a temperature above 100° C. and under a pressure sufficient to maintain the reactants and reaction medium substantially in the liquid phase a halogenated paraffin hydrocarbon, in which at most 1 atom of a halogen of atomic weight greater than 30 is attached to any one carbon atom, with more than 1.5 molecular proportions of ammonia and more than 3 molecular proportions of an ammonium halide in which the halogen is of the class specified above for each atomic proportion of halogen in the halogenated hydrocarbon.

2. Process for the manufacture of aliphatic primary amines, which comprises heating to a temperature of 120°–200° C. and under a pressure sufficient to maintain the reactants and water substantially in the liquid phase a chlorinated paraffin hydrocarbon, in which at most 1 chlorine atom is attached to any one carbon atom, with an aqueous solution of ammonia and ammonium chloride containing at least 1.5 molecular proportions of ammonia and at least 8 molecular proportions of ammonium chloride for each atomic proportion of chlorine in the chlorinated hydrocarbon.

3. Process for the manufacture of mono-alkylamines, which comprises heating to a temperature of 120°–200° C. and under a pressure sufficient to maintain the reactants and water substantially in the liquid phase 1 molecular proportion of an alkyl chloride with an aqueous solution containing 1.5–3 molecular proportions of ammonia and more than 8 molecular proportions of ammonium chloride.

4. Process for the manufacture of alkylene diprimary amines, which comprises heating to a temperature of 120°–200° C. and under a pressure sufficient to maintain the reactants and water substantially in the liquid phase 1 molecular proportion of an alkylene dichloride with an aqueous solution containing 3–6 molecular proportions of ammonia and more than 16 molecular proportions of ammonium chloride.

5. Process for the manufacture of ethylamine, which comprises heating to a temperature 120°–200° C. and under a pressure sufficient to maintain the reactants and water substantially in the liquid phase 1 molecular proportion of an ethyl chloride with an aqueous solution containing 1.5–3 molecular proportions of ammonia and more than 8 molecular proportions of ammonium chloride.

6. Process for the manufacture of butylamine, which comprises heating to a temperature of 120°–200° C. and under a pressure sufficient to maintain the reactants and water substantially in the liquid phase 1 molecular proportion of butyl chloride with an aqueous solution containing 1.5–3 molecular proportions of ammonia and more than 8 molecular proportions of ammonium chloride.

7. Process for the manufacture of hexamethylene diamines, which comprises heating to a temperature of 120°–200° C. and under a pressure sufficient to maintain the reactants and water substantially in the liquid phase 1 molecular proportion of 1:6 dichlorhexane with an aqueous solution containing 3–6 molecular proportions of ammonia and more than 16 molecular proportions of ammonium chloride.

HORACE FINNINGLEY OXLEY.
EDWARD BOADEN THOMAS.
FRANK SANDHAM NICHOLS.

REFERENCES CITED

The following references are of record in the file of this patent:

UNITED STATES PATENTS

| Number | Name | Date |
| --- | --- | --- |
| 1,607,824 | Hale et al. | Nov. 23, 1926 |
| 1,726,173 | Williams et al. | Aug. 27, 1929 |
| 1,775,360 | Williams | Sept. 9, 1930 |
| 1,832,534 | Curme | Nov. 17, 1931 |
| 2,036,134 | Graenacher et al. | Mar. 31, 1936 |

FOREIGN PATENTS

| Number | Country | Date |
| --- | --- | --- |
| 336,136 | Great Britain | Oct. 9, 1930 |

OTHER REFERENCES

Groggins et al.: "J. Ind. Eng. Chem."; vol. 25, pp. 42–49 (1933).

Groggins et al.: "J. Ind. Eng. Chem."; vol. 25, pp. 169–175 (1933).

Degering: "Organic Nitrogen Compounds"; (Univ. Lithoprinters, Ypsilanti, Mich., 1945) pp. 200–201.